(12) United States Patent
Shirai

(10) Patent No.: US 8,833,848 B2
(45) Date of Patent: Sep. 16, 2014

(54) BICYCLE SEAT HEIGHT ADJUSTMENT METHOD

(71) Applicant: Shimano Inc., Osaka (JP)

(72) Inventor: Toyoto Shirai, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 13/942,628

(22) Filed: Jul. 15, 2013

(65) Prior Publication Data

US 2013/0300163 A1    Nov. 14, 2013

Related U.S. Application Data

(62) Division of application No. 12/761,437, filed on Apr. 16, 2010, now Pat. No. 8,550,551.

(51) Int. Cl.
*B62J 1/00* (2006.01)
*B62K 19/36* (2006.01)

(52) U.S. Cl.
CPC ... *B62J 1/00* (2013.01); *B62K 19/36* (2013.01)
USPC .............. 297/215.13; 297/215.14; 297/195.1; 297/344.2; 280/226.1; 318/264; 318/486

(58) Field of Classification Search
USPC .................... 280/200, 221, 226.1; 297/195.1, 297/215.13, 215.14, 344.18, 344.19, 344.2; 318/264, 265, 266, 272, 275, 277, 445, 318/466, 467, 468, 469, 484, 626
See application file for complete search history.

(56) References Cited

U.S. PATENT DOCUMENTS

| | | | | |
|---|---|---|---|---|
| 6,050,585 | A * | 4/2000 | Rai ............................ | 280/288.4 |
| 8,016,349 | B2 * | 9/2011 | Mouri et al. ............. | 297/215.13 |
| 8,641,073 | B2 * | 2/2014 | Lee et al. .................. | 280/288.4 |
| 2008/0303320 | A1 * | 12/2008 | Schranz .................... | 297/215.14 |
| 2012/0228906 | A1 * | 9/2012 | McAndrews et al. .... | 297/215.13 |

* cited by examiner

*Primary Examiner* — Ernesto Suarez
(74) *Attorney, Agent, or Firm* — Global IP Counselors

(57) ABSTRACT

A bicycle seat height adjustment method is provided for changing a height of a bicycle seat. The method includes operating an operating device to output a seat raising command which is received by a motorized seat height adjustment mechanism to adjust the seat height. The method further includes releasing the operating device after the operating of the operating device. The method further includes raising the bicycle seat using the electric motor to a higher seat position that is higher than a previous seat position existing immediately prior to the seat raising command, the raising of the bicycle seat occurring only after the releasing of the operating device such that the bicycle seat remains stationary until the operating device is released.

15 Claims, 13 Drawing Sheets

US 8,833,848 B2

BICYCLE SEAT HEIGHT ADJUSTMENT METHOD

This application is a divisional application of U.S. patent application Ser. No. 12/761,437 filed on Apr. 16, 2010. The entire disclosure of U.S. patent application Ser. No. 12/761,437 is hereby incorporated herein by reference.

BACKGROUND OF THE INVENTION

1. Field of the Invention

This invention generally relates to a seatpost that is adjustable to adjust the seat height of a bicycle seat. More specifically, the present invention relates to a bicycle seat height adjustment method in which a bicycle seat can be adjusted with respect to a bicycle frame after releasing a user operating device.

2. Background Information

A bicycle seat is normally supported on a bicycle frame by a seatpost that is telescopically disposed in the seat tube of the bicycle frame. The bicycle seat typically has a pair of parallel rails extending along the bottom of the seat. The rails of the bicycle seat are attached to the seatpost by a clamp at the top of the seatpost. The height of the bicycle seat with respect to the bicycle frame is typically adjusted by changing the insertion amount of the seatpost in the seat tube of the bicycle frame. The upper end of the seat tube is typically provided with a longitudinal slit and a clamping arrangement that adjusts the diameter of the upper end of the seat tube to squeeze the seatpost for securing the seatpost in the desired position with respect to the bicycle frame. Recently, seatpost assemblies have been proposed that are hydraulically operated in order to adjust the height of the seat. One example of a hydraulically operated seatpost assembly is disclosed in U.S. Pat. No. 7,083,180.

In view of the above, it will be apparent to those skilled in the art from this disclosure that there exists a need for an improved bicycle seatpost that is adjustable in height. This invention addresses this need in the art as well as other needs, which will become apparent to those skilled in the art from this disclosure.

SUMMARY OF THE INVENTION

One object of the present invention is to provide a bicycle seat height adjustment method in which a bicycle seat can be adjusted with respect to a bicycle frame after releasing a user operating device that was operated perform the adjustment.

In accordance with one aspect of the present disclosure, a bicycle seat height adjustment method is provided that comprises: operating an operating device such that the operating device outputs a seat raising command which is received by a motorized seat height adjustment mechanism to raise the bicycle seat, the motorized seat height adjustment mechanism including an electric motor; releasing the operating device after the operating of the operating device; and raising the bicycle seat using the electric motor to a higher seat position that is higher than a previous seat position existing immediately prior to the seat raising command, the raising of the bicycle seat occurring only after the releasing of the operating device such that the bicycle seat remains stationary until the operating device is released.

In accordance with another aspect of the present disclosure, a bicycle seat height adjustment method is provided that comprises: operating an operating device such that the operating device outputs a seat lowering command which is received by a motorized seat height adjustment mechanism to lower the bicycle seat, the motorized seat height adjustment mechanism including an electric motor; releasing the operating device after the operating of the operating device; and lowering the bicycle seat using the electric motor to a lower seat position that is lower than a previous seat position existing immediately prior to the seat lowering command, the lowering of the bicycle seat occurring only after the releasing of the operating device such that the bicycle seat remains stationary until the operating device is released.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
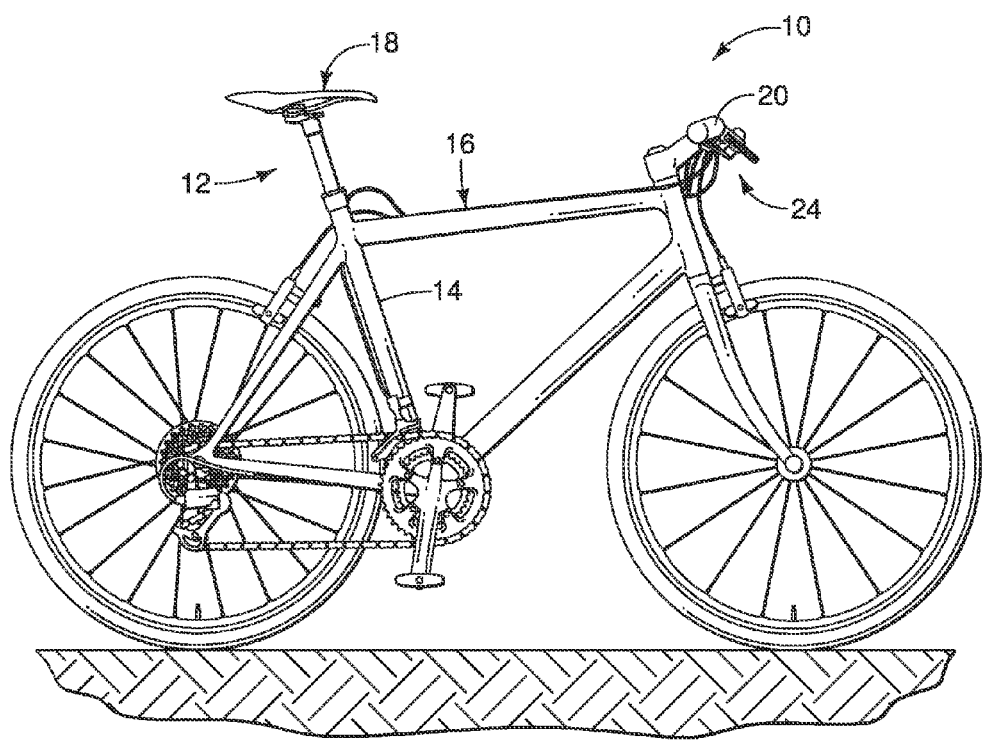
FIG. 1 is a side elevational view of a bicycle in which a bicycle seatpost assembly that can be used to carry out a bicycle seat height adjustment method in accordance with one embodiment.
Figure 2:
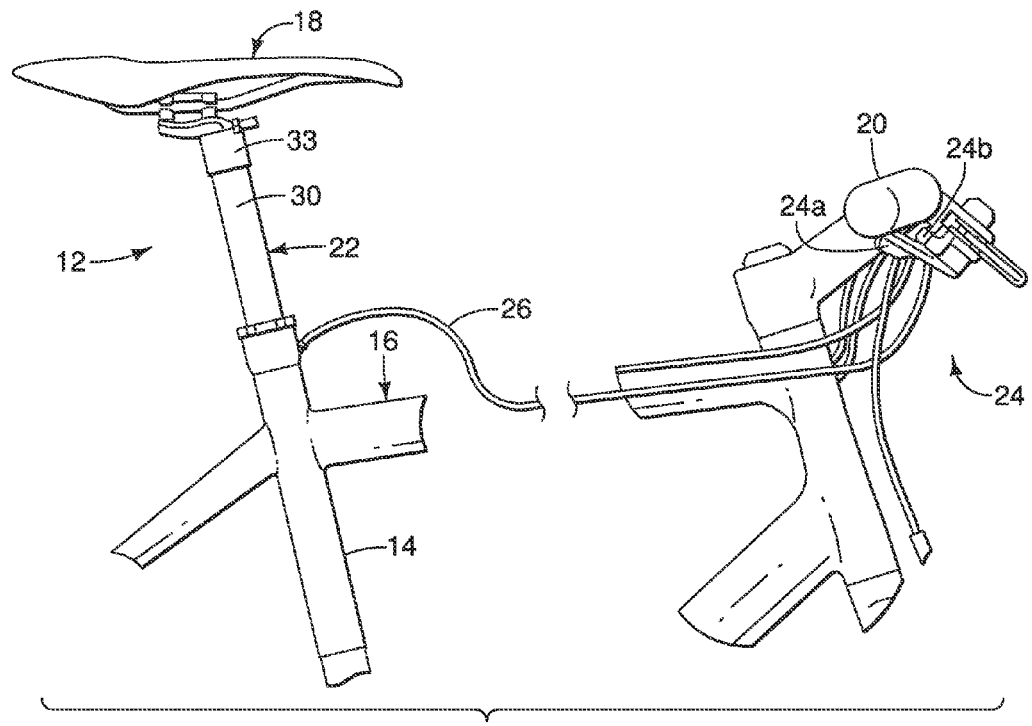
FIG. 2 is a partial side view of the bicycle illustrated in FIG. 1 that is equipped with the bicycle seatpost assembly in the high or top seat position.

Referring initially to FIGS. 1 and 2, a bicycle 10 is illustrated with a seatpost assembly 12 in accordance with a first embodiment. The bicycle seatpost assembly 12 is mounted to a seat tube 14 of a bicycle frame 16. The bicycle seatpost assembly 12 adjusts a seat height of a bicycle seat 18 with respect to the bicycle frame 16. Basically, the bicycle seatpost assembly 12 includes a telescoping seatpost 22, an operating member or device 24 and a movement transmission element 26 that operatively couples the operating device 24 to the telescoping seatpost 22 for adjusting the height of the telescoping seatpost 22. In this embodiment, the length of the telescoping seatpost 22 is adjustable to three predetermined or preset seat positions, e.g., a high seat position, a middle seat position and a low seat position. The high seat position is a riding position for when the bicycle 10 runs in the flat road or uphill. The middle seat position is a riding position for when the bicycle 10 runs in the slightly rapid downhill. The low seat position is a riding position for when the bicycle 10 runs in the considerably rapid downhill. With the bicycle seatpost assembly 12, the rider can easily change the seat position while riding the bicycle 10, i.e., without stopping.

In this illustrated embodiment, the operating device 24 is mounted to the handlebar 20 of the bicycle 10, with the movement transmission element 26 being a wire that is pulled by operation of an operating lever 24a of the operating device 24 and that is released by operation of an operating lever 24b of the operating device 24. In this illustrated embodiment, the internal operating parts of the operating device 24 includes a wire positioning (winding and releasing) such as used in Shimano Inc.'s RAPIDFIRE® line of shifters. However, the operating device 24 can be any type of operating device that can carry out the operation of changing the height of the telescoping seatpost 22. For example, an operating device can be used that has a single lever in which the single lever is moved in different directions for performing wire winding and wire releasing operations, respectively. Also, for example, an operating device can be used that has a single lever in which the single lever has different movement amounts for performing wire winding and wire releasing operations, respectively. Also, the movement transmission element 26 does not necessary need to be a wire as shown. For example, the movement transmission element 26 could be a fluid hose or an electrical wire, if needed and/or desired.

Figure 3:
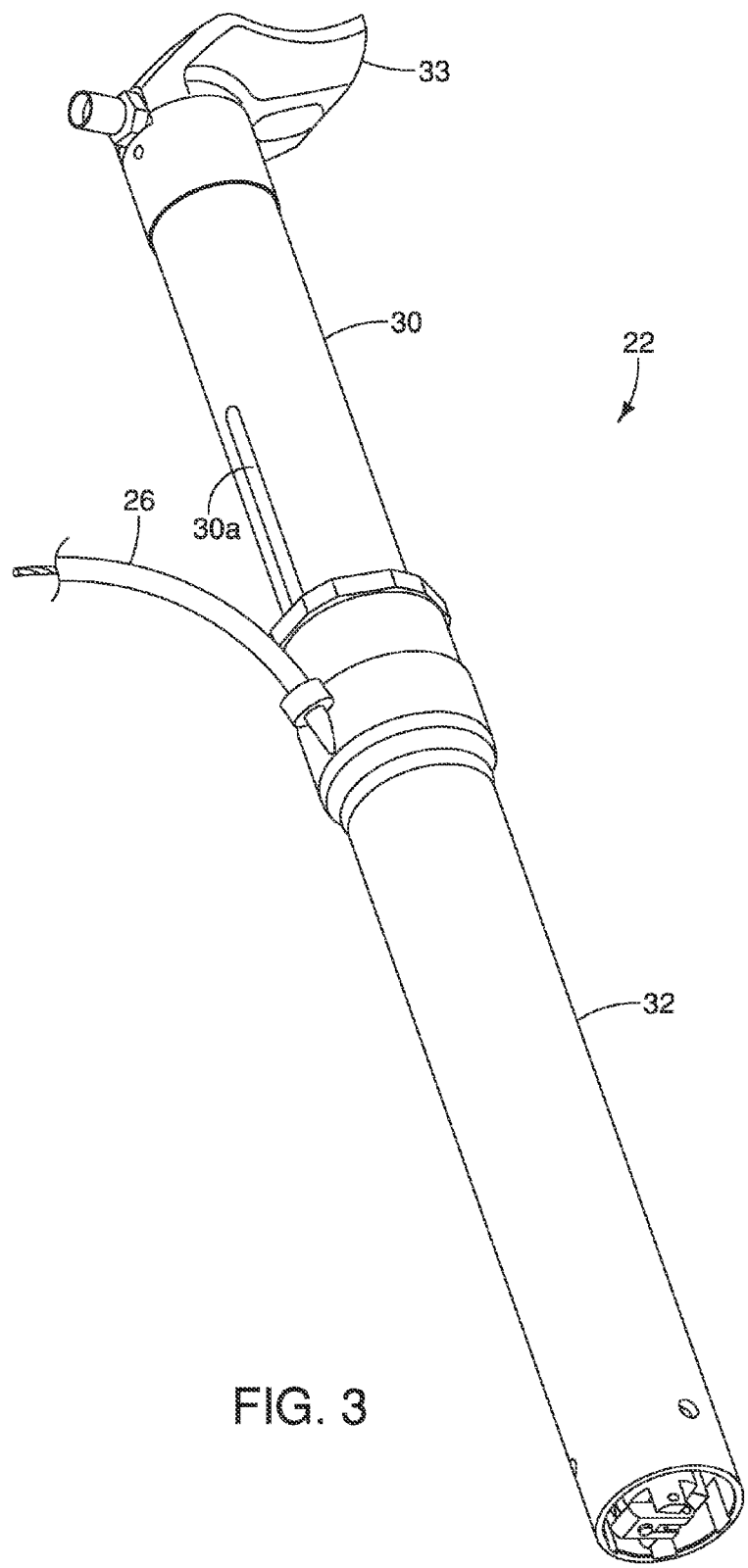
FIG. 3 is a perspective view of the bicycle seatpost assembly illustrated in FIGS. 1 and 2 with the bicycle seatpost assembly in the high or top seat position.

Referring now to FIG. 3, the telescoping seatpost 22 is a separate unit from the bicycle frame 16 such that it can be easily installed into the seat tube 14 in place of a conventional non-adjustable seatpost. Basically, the telescoping seatpost 22 mainly includes an inner (first) tube 30 and an outer (second) tube 32. As mentioned above, the height of the telescoping seatpost 22 is adjustable to three predetermined seat positions. In particular, the inner and outer tubes 30 and 32 are telescopically arranged, with the amount of insertion of the inner tube 30 into the outer tube 32 being adjustable. The outer tube 32 is secured to the seat tube 14 by a conventional clamping arrangement (not shown) provided on the upper end of the seat tube 14. In particular, the upper end of the seat tube 14 is provided with a longitudinal slit such that the clamping arrangement adjusts the diameter of the upper end of the seat tube to squeeze the outer tube 32. The upper end of the inner tube 30 includes a seat mounting member 33 that secures the bicycle seat 18 thereto.

Figure 4:
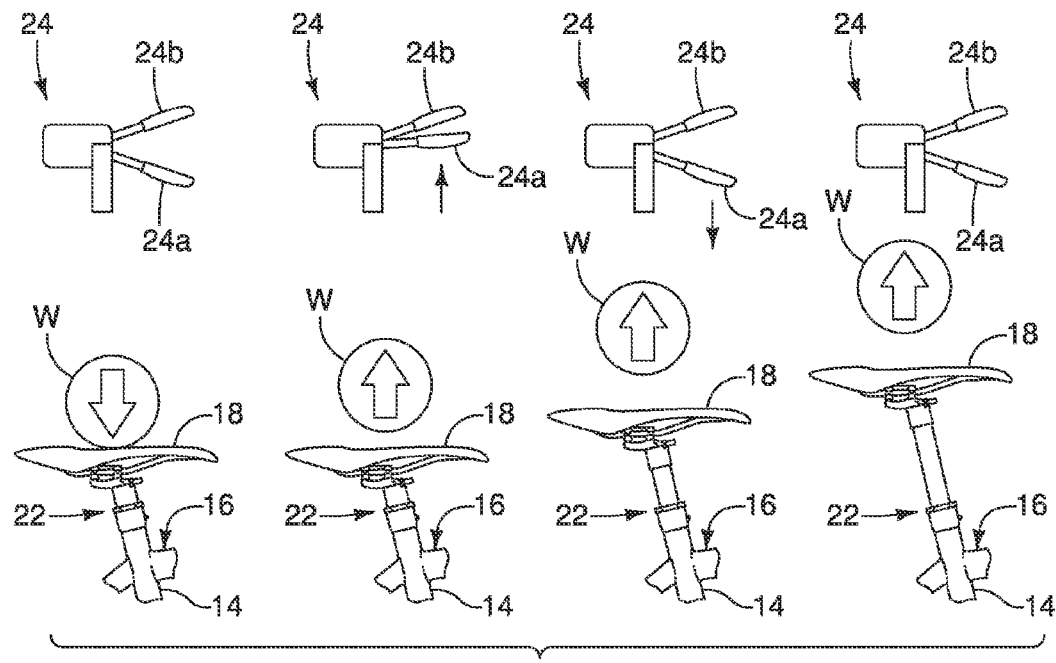
FIG. 4 is a series of diagrammatic views showing a bicycle seat raising operation using the bicycle seatpost assembly illustrated in FIGS. 1 to 3 in which the bicycle seat immediately rises after operating the user operating device.
Figure 5:
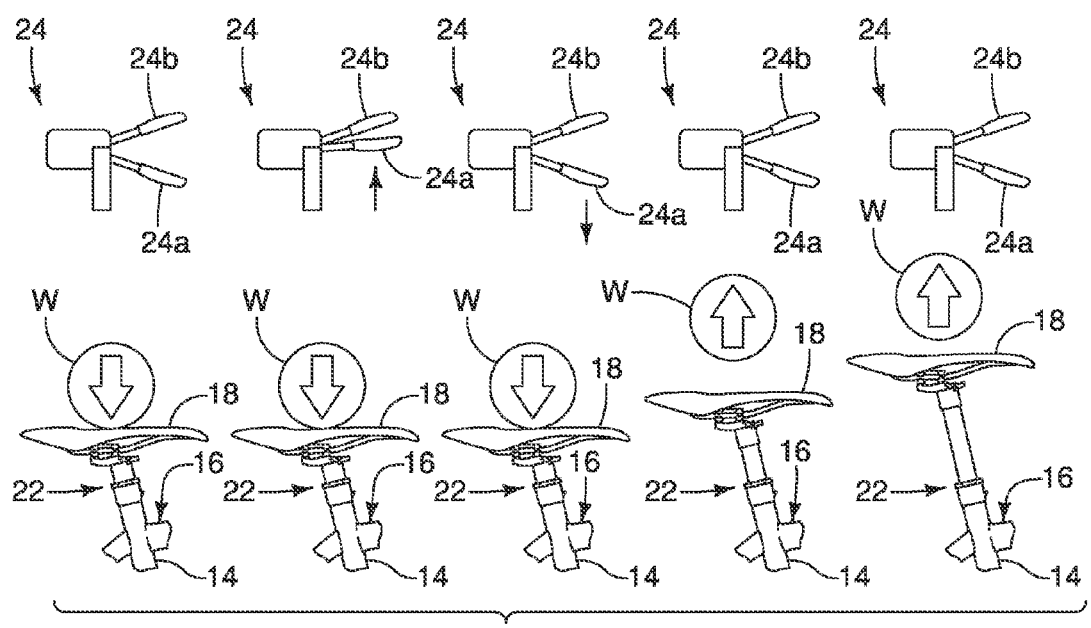
FIG. 5 is a series of diagrammatic views showing a bicycle seat raising operation using the bicycle seatpost assembly illustrated in FIGS. 1 to 3 in which a downward force (e.g., the weight of the rider) is maintained on the bicycle seat for a period of time after releasing the user operating device with the bicycle seat immediately rising after removal of the downward force on the bicycle seat.
Figure 6:
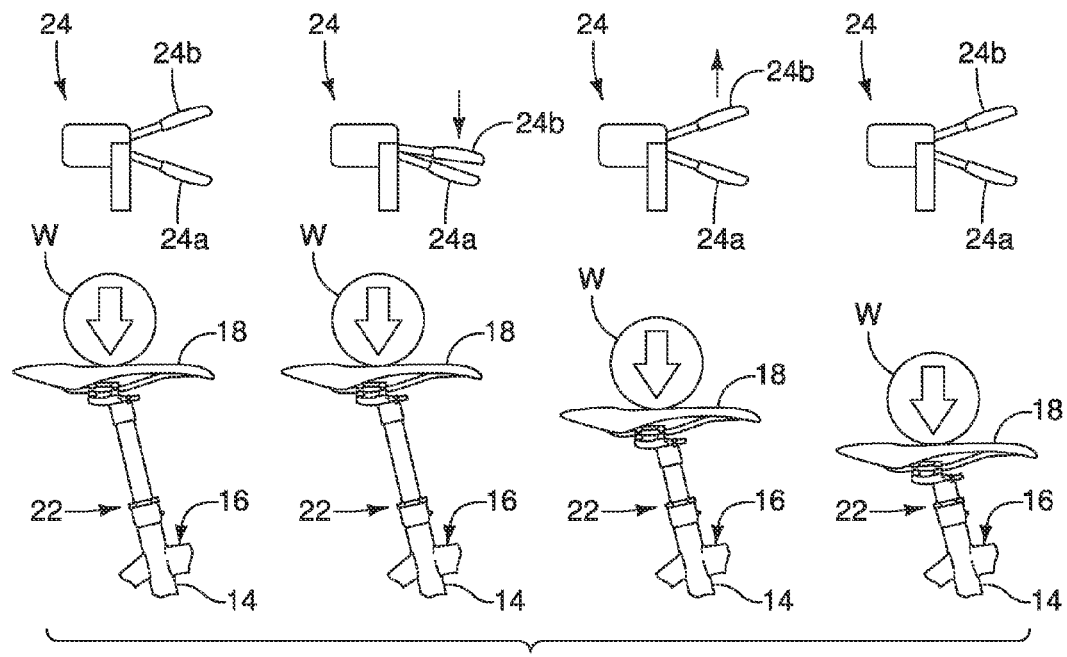
FIG. 6 is a series of diagrammatic views showing a bicycle seat lowering operation using the bicycle seatpost assembly illustrated in FIGS. 1 to 3 in which the bicycle seat immediately falls after operating the user operating device due to a downward force (e.g., the weight of the rider) being maintained on the bicycle seat during the operation of the user operating device.
Figure 7:
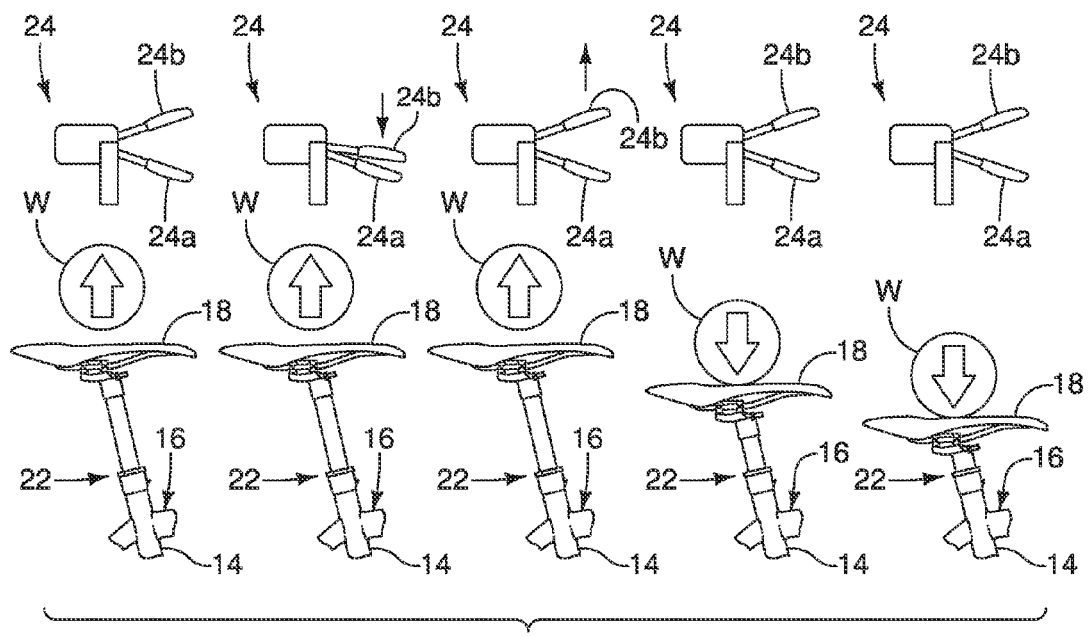
FIG. 7 is a series of diagrammatic views showing a bicycle seat lowering operation using the bicycle seatpost assembly illustrated in FIGS. 1 to 3 in which a downward force (e.g., the weight of the rider) is applied on the bicycle seat some period of time completing after the operation of the user operating device such that the bicycle seat does not immediately fall after releasing the user operating device but rather the bicycle seat falls whenever a downward force (e.g., the weight of the rider) is subsequently applied to the bicycle seat.

Referring now to FIGS. 4 to 7, bicycle seat height adjustment methods are illustrated for adjusting the height of the bicycle seat 18 using the telescoping seatpost 22 shown herein. However, other types of telescoping seatpost can be used such as motorized telescoping seatposts such as disclosed in U.S. application Ser. No. 12/549,436, filed on Aug. 28, 2009 (assigned to Shimano Inc.) and U.S. application Ser. No. 12/710,563, filed on Feb. 23, 2010 (assigned to Shimano Inc.). In particular, FIGS. 4 and 5 illustrate a bicycle seat height adjustment method for raising the height of the bicycle seat 18 using the telescoping seatpost 22, while FIGS. 6 and 7 illustrate a bicycle seat height adjustment method for lowering the height of the bicycle seat 18 using the telescoping seatpost 22. FIG. 4, a first bicycle seat raising operation is illustrated in which the bicycle seat 18 immediately starts rising after completing an operation of the operating lever 24a to output a seat raising command (an inner wire winding operation in this embodiment), because the weight of the rider (e.g., a downward force W) is not present upon releasing the operating lever 24b of the user operating device 24. In FIG. 4, the first bicycle seat raising operation is a preselect bicycle seat raising operation in which the bicycle seat 18 is raised to a preset seat position. In FIG. 5, a second bicycle seat raising operation is illustrated in which the weight of the rider (e.g., the downward force W) is maintained on the bicycle seat 18 for a period of time after releasing the operating lever 24a of the user operating device 24 such that the bicycle seat 18 immediately rising after removal of the downward force W on the bicycle seat 18. In FIG. 5, the second bicycle seat raising operation is a preselect bicycle seat raising operation in which the bicycle seat 18 is raised to a preset seat position. In FIG. 6, a first bicycle seat lowering operation is illustrated in which the bicycle seat 18 immediately starts lowering after completing an operation of the operating lever 24b to output a seat raising command (an inner wire releasing operation in this embodiment) due to the weight of the rider (e.g., a downward force W) being present upon rotating or pushing the operating lever 24b of the user operating device 24. In FIG. 6, the first bicycle seat lowering operation is a preselect bicycle seat lowering operation in which the bicycle seat 18 is lowered to a preset seat position. In FIG. 7, a second bicycle seat lowering operation is illustrated in which the weight of the rider (e.g., the downward force W) is not present on the bicycle seat 18 until some period of time after releasing the operating lever 24b of the user operating device 24 such that the bicycle seat 18 immediately lowers whenever a downward force (e.g., the weight of the rider) is subsequently applied to the on the bicycle seat 18. In FIG. 7, the second bicycle seat lowering operation is a preselect bicycle seat lowering operation in which the bicycle seat 18 is lowered to a preset seat position.

Referring to FIGS. 4 and 5, the bicycle seat raising operations will be discussed in more detail in accordance with bicycle seat height adjustment methods that use the telescoping seatpost 22 and the user operating device 24. In FIGS. 4 and 5, the telescoping seatpost 22 is a three position telescoping seatpost, while the user operating device 24 is a dual trigger lever operating device in which the operating levers 24a and 24b are both biased to their rest positions. The telescoping seatpost 22 is adjusted by removing or applying a downward force W such as by using the rider's weight.

Generally, in this preferred bicycle seat height adjustment method of FIGS. 4 and 5, a rider raises the height of the bicycle seat 18 by first operating the operating lever 24a of the user operating device 24, which is in the rest position as seen in the first or leftmost illustration in FIGS. 4 and 5. This operation of the operating lever 24a of the user operating device 24 results in a seat raising command being output to raise the bicycle seat 18. In the illustrated embodiment, the operating lever 24a of the user operating device 24 is rotated in a counterclockwise direction from the rest position as seen in the first illustration from the left in FIGS. 4 and 5 to an operating or actuating position as seen in the second illustration from the left in FIGS. 4 and 5. This rotation of the operating lever 24a of the user operating device 24 pulls the inner wire of the movement transmission element 26 (e.g. a Bowden cable) such that the seat raising command corresponds to pulling the inner wire of the movement transmission element 26 (e.g. a Bowden cable). However, the seat raising command corresponds to an electrical signal when an electrically operated telescoping seatpost is used that has an electric motor or the like for adjusting the seat's height. Similarly, the seat raising command corresponds to fluid pressure when a fluid operated telescoping seatpost is used that using a fluid such as air, hydraulic fluid or other suitable fluid for adjusting the seat's height. In any event, in the illustrated embodiment, the rider releases the operating lever 24a of the user operating device 24 after the operating the operating lever 24a of the user operating device 24 as seen in the third illustration from the left in FIGS. 4 and 5. Due to the operating lever 24a of the user operating device 24 being biased in the clockwise direction in FIGS. 4 and 5, the operating lever 24a returns to the rest position as seen in the third illustration from the left in FIGS. 4 and 5. As seen in FIG. 4, if the downward force (e.g., the rider's weight W) is removed prior to or at the time that the operating lever 24a of the user operating device 24 is rotated to the actuating position (e.g., the second illustration from the left in FIG. 4) to raise the bicycle seat 18, then the telescoping seatpost 22 will immediately raise the bicycle seat 18 to the next higher predetermined seat position (e.g., the third and fourth illustrations from the left in FIG. 4) without any further actions by the rider. On the other hand, if the downward force (e.g., the rider's weight W) is being applied to the bicycle seat 18 while operating the operating lever 24a and immediately after release of the operating lever 24a, then the bicycle seat 18 will remain in the same seat position that existed prior to the operation of the operating lever 24a (e.g., the third illustration from the left in FIG. 5). Once the downward force (e.g., the rider's weight W) is removed from the bicycle seat 18, the telescoping seatpost 22 will immediately raise the bicycle seat 18 to the next higher predetermined seat position (e.g., the fourth and fifth illustrations from the left in FIG. 5) without any further actions by the rider. In other words, in this bicycle seat raising operation, the raising of the bicycle seat 18 to the next higher seat position that is higher than the previous seat position existing immediately prior to the seat raising command occurs by removing the downward force W from the bicycle seat 18 after releasing the operating lever 24a of the operating device 24. With the configuration of the seatpost assembly 22, if the downward force (e.g., the rider's weight W) is applied to the bicycle seat 18 during the raising operation of FIGS. 4 and 5, then the bicycle seat 18 will stop in its current seat position. In the illustrated embodiment, this bicycle seat raising operation results in a predetermined amount of upward movement, when raising of the bicycle seat 18 from a current seat position to the next higher seat position. In other words, this bicycle seat raising operation results in a predetermined seat position.

Referring to FIGS. 6 and 7, bicycle seat lowering operations will be discussed in accordance with bicycle seat height adjustment methods that use the telescoping seatpost 22 and the user operating device 24. Generally, in this preferred bicycle seat height adjustment method of FIGS. 6 and 7, a rider lowers the height of the bicycle seat 18 by first operating the operating lever 24b of the user operating device 24, which is in the rest position as seen in the first or leftmost illustration in FIGS. 6 and 7. This operation of the operating lever 24b of the user operating device 24 results in a seat lowering command being output to lower the bicycle seat 18. In the illustrated embodiment, the operating lever 24b of the user operating device 24 is rotated in a clockwise direction from the rest position as seen in the first illustration from the left in FIGS. 6 and 7 to an operating or actuating position as seen in the second illustration from the left in FIGS. 6 and 7. This rotation of the operating lever 24b of the user operating device 24 releases the inner wire of the movement transmission element 26 (e.g. a Bowden cable) such that the seat lowering command corresponds to releasing the inner wire of the movement transmission element 26 (e.g. a Bowden cable). However, the seat lowering command corresponds to an electrical signal when an electrically operated telescoping seatpost is used that has an electric motor or the like for adjusting the seat's height. Similarly, the seat lowering command corresponds to fluid pressure when a fluid operated telescoping seatpost is used that using a fluid such as air, hydraulic fluid or other suitable fluid for adjusting the seat's height. In any event, in the illustrated embodiment, the rider releases the operating lever 24b of the user operating device 24 after the operating the operating lever 24b of the user operating device 24 as seen in the third illustration from the left in FIGS. 6 and 7. Due to the operating lever 24b of the user operating device 24 being biased in the counterclockwise direction in FIGS. 6 and 7, the operating lever 24b returns to the rest position as seen in the third illustration from the left in FIGS. 6 and 7. As seen in FIG. 6, if the downward force (e.g., the rider's weight W) is being applied at the time that the operating lever 24b of the user operating device 24 is rotated to the actuating position (e.g., the second illustration from the left in FIG. 6) and immediately after release of the operating lever 24b, then the telescoping seatpost 22 will immediately lower the bicycle seat 18 to the next lower predetermined seat position (e.g., the third and fourth illustrations from the left in FIG. 6) without any further actions by the rider. On the other hand, if the downward force (e.g., the rider's weight W) is not being applied to the bicycle seat 18 while operating the operating lever 24b and immediately after release of the operating lever 24b, then the bicycle seat 18 will remain in the same seat position that existed prior to the operation of the operating lever 24b (e.g., the third illustration from the left in FIG. 7). Once the downward force (e.g., the rider's weight W) is applied to the bicycle seat 18, the telescoping seatpost 22 will immediately lower the bicycle seat 18 to the next higher predetermined seat position (e.g., the fourth and fifth illustrations from the left in FIG. 7) without any further actions by the rider. In other words, in this bicycle seat lowering operation, the lowering of the bicycle seat 18 to the next lower seat position that is lower than the previous seat position existing immediately prior to the seat lowering command occurs by applying the downward force W to the bicycle seat 18 after releasing the operating lever 24b of the operating device 24. With the configuration of the seatpost assembly 22, if the downward force (e.g., the rider's weight W) is removed from the bicycle seat 18 during the seat lowering operations of FIGS. 6 and 7, then the bicycle seat 18 will stop in its current seat position. In the illustrated embodiment, this bicycle seat lowering operation results in a predetermined downward of upward movement, when lowering of the bicycle seat 18 from a current seat position to the next lower seat position.

Deferring now to FIGS. 8 to 11, the telescoping seatpost 22 will now be briefly discussed. A detailed explanation of the operation of the hydraulic adjustment mechanism of the telescoping seatpost 22 is disclosed in U.S. application Ser. No. 12/554,092, filed on Sep. 4, 2009. The telescoping seatpost 22 further includes a floating piston 34, a rod 36, a guide member 38, a flow control rod 40 and a valve unit 42. The valve unit 42 divides the interior bore of the inner tube 30 into a first or upper fluid chamber 46 and a second or lower fluid chamber 48.

The inner tube 30 is provided with a longitudinal slot 30a (FIG. 3) that receives a key (not shown) for preventing relative rotation between the inner and outer tubes 30 and 32. The lower end of the slot 30a forms a channel between the inner and outer tubes 30 and 32 for receiving the movement transmission element 26. The inner tube 30 has an upper end 50 with a seat mounting member 52 fixed (threaded) thereto and a lower end 54 with a guide block 56 fixed (threaded) thereto. The seat mounting member 52 includes an air filler valve port 55 for receiving pressurized air or other gaseous fluid. The air filler valve port 55 includes an air filler valve (not shown), which is a one-way valve for filling the upper end of the inner tube 30 with compressed air. The seat mounting member 52 seals off the upper end 50 of the inner tube 30, while the guide block 56 seals of the lower end 54 of the inner tube 30. The guide block 56 is slidably supported on the guide member 38 in an air tight manner. Thus, the guide block 56 acts as a bottom plug of the lower end 54 of the inner tube 30. Also the guide block 56 acts as an abutment for limiting downward movement of the inner tube 30 with respect to the outer tube 32. While the guide block 56 extends out of the lower end 54 of the inner tube 30, alternatively, it is also feasible to recess the guide block 56 from the lower end 54 of the inner tube 30 and provide a separate abutment arrangement for limiting downward movement of the inner tube 30 with respect to the outer tube 32.

Figure 9:
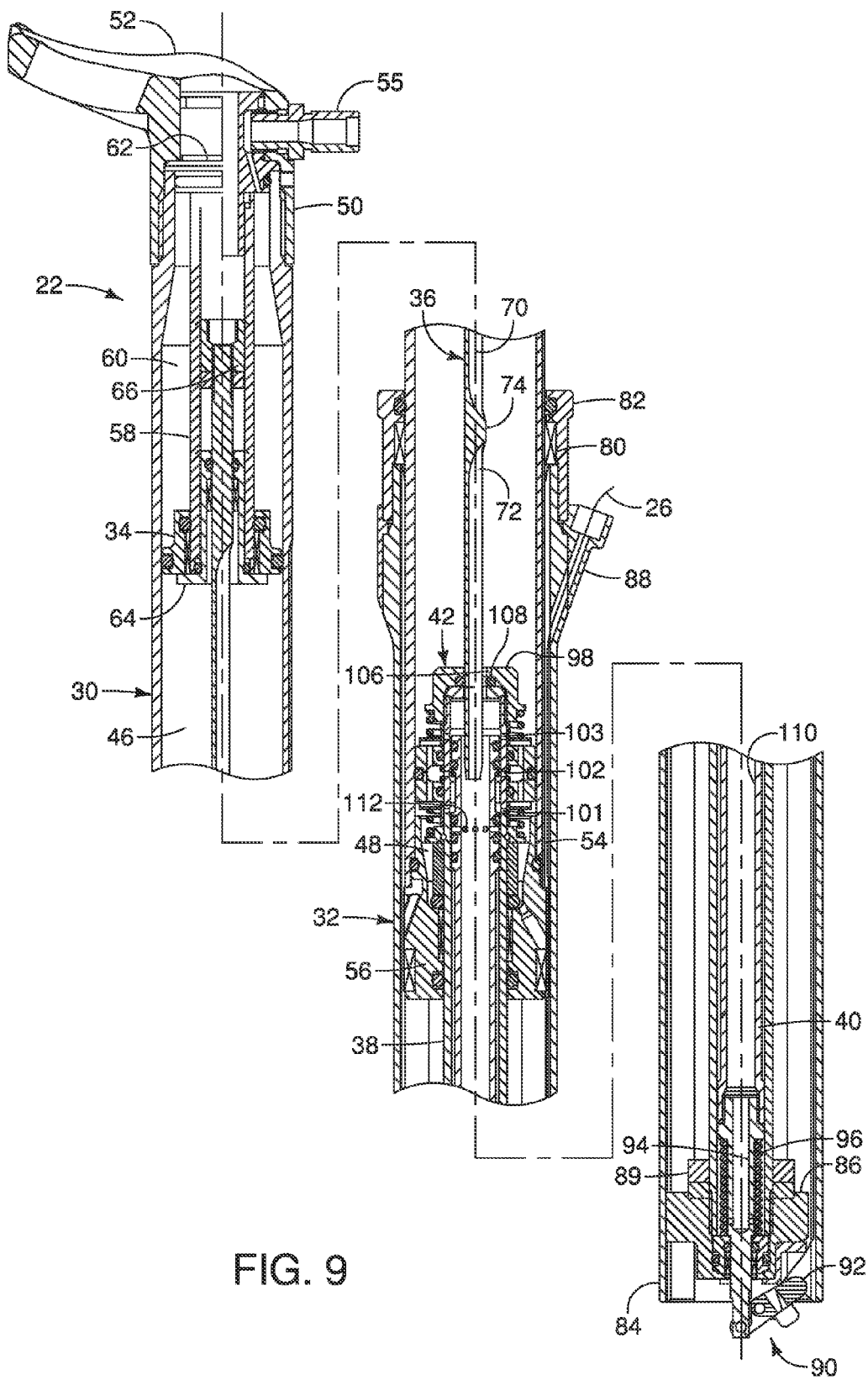
FIG. 9 is a longitudinal cross sectional view of the bicycle seatpost assembly illustrated in FIGS. 1 to 3 and 8, with the bicycle seatpost assembly in the high or top seat position.
Figure 10:
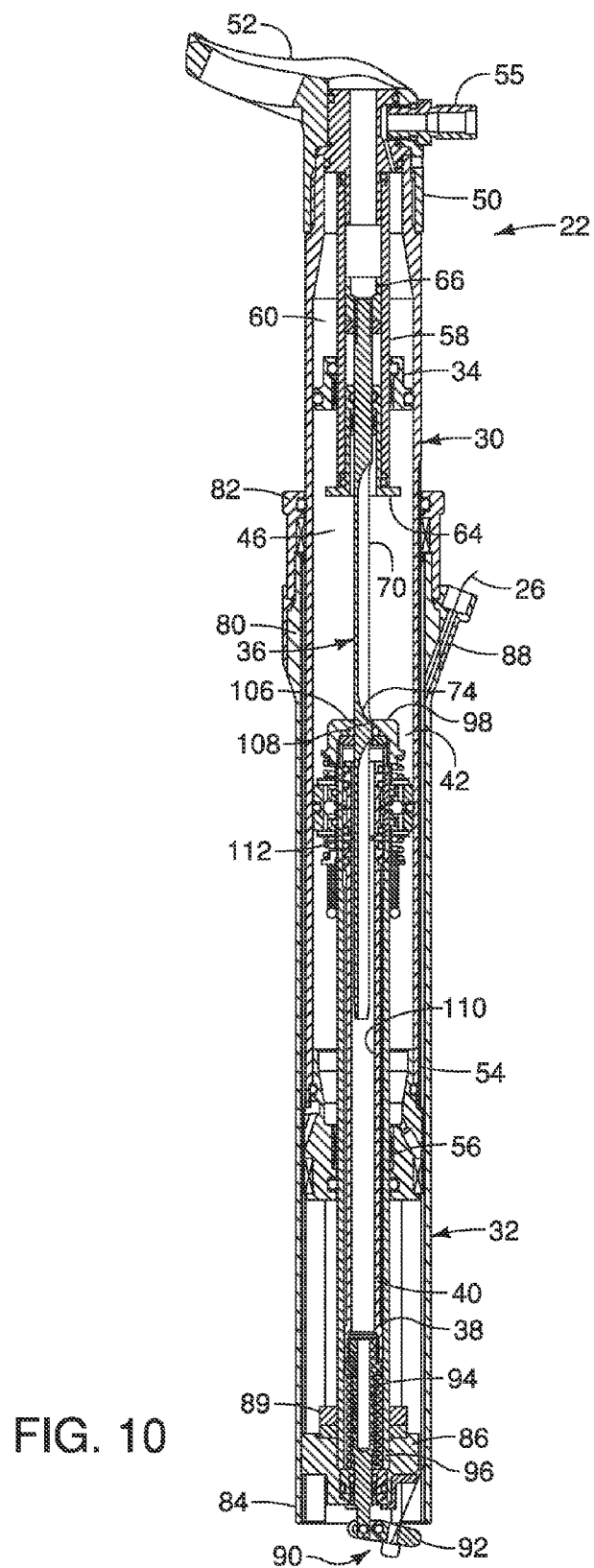
FIG. 10 is a longitudinal cross sectional view of the bicycle seatpost assembly illustrated in FIGS. 1 to 3, 8 and 9, with the bicycle seatpost assembly in the middle seat position.
Figure 11:
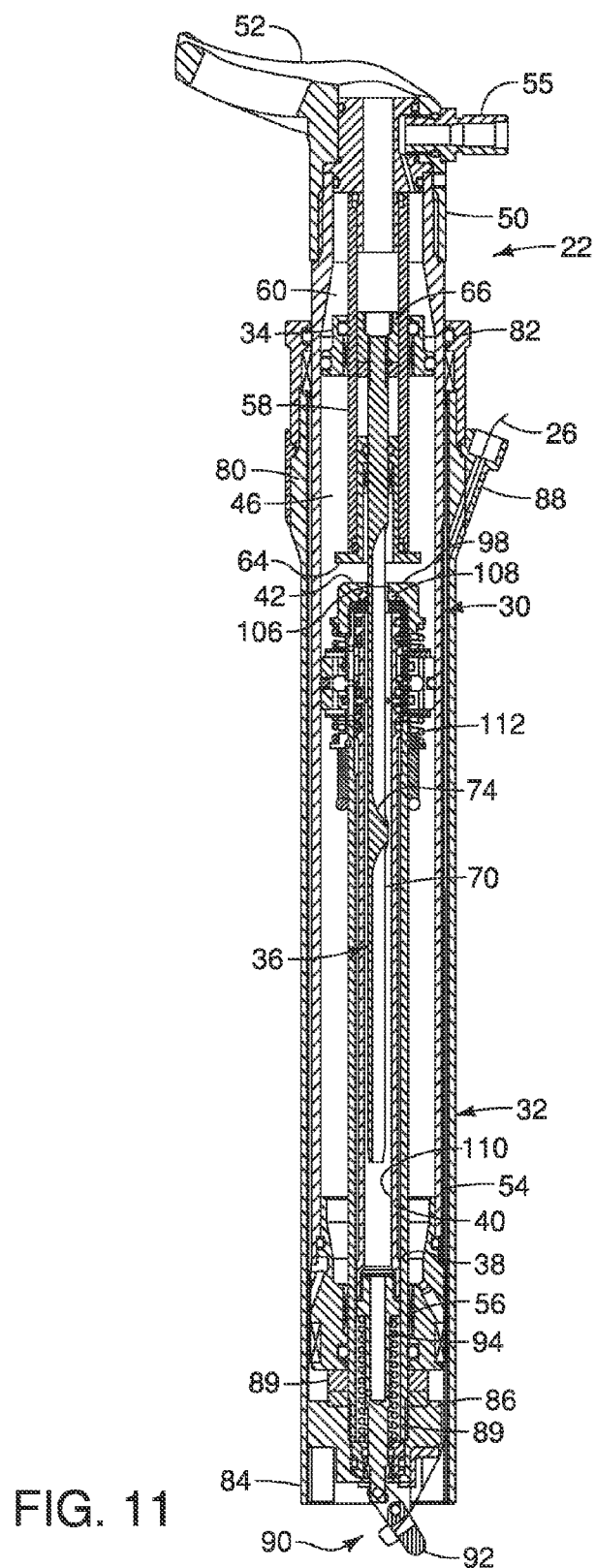
FIG. 11 is a longitudinal cross sectional view of the bicycle seatpost assembly illustrated in FIGS. 1 to 3 and 8 to 10, with the bicycle seatpost assembly in the low or bottom seat position.
Figure 12:
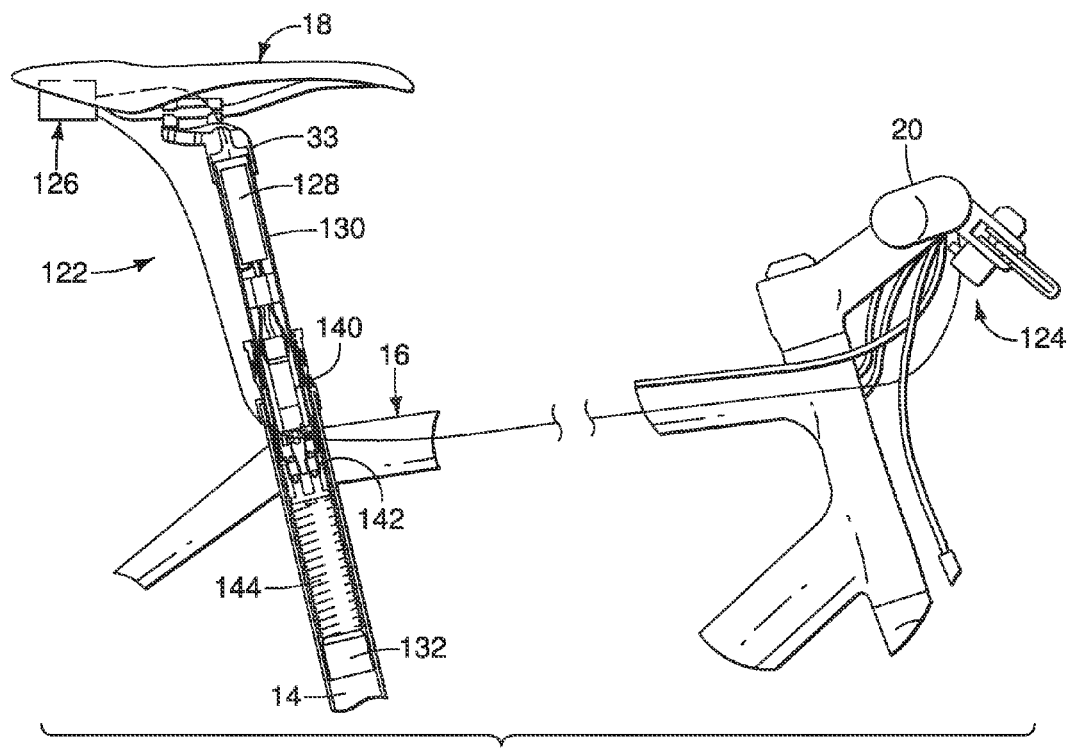
FIG. 12 is a partial side view of the bicycle illustrated in FIG. 1 that is equipped with a motorized bicycle seatpost assembly in a high or top seat position in accordance with a second embodiment.
Figure 13:
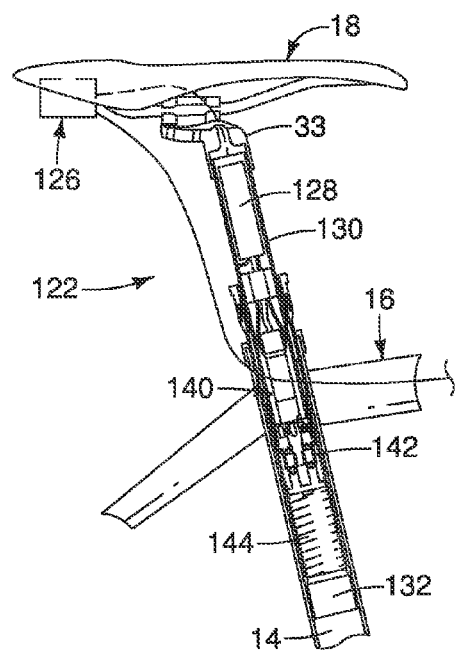
FIG. 13 is a partial side view of the bicycle illustrated in FIG. 12 with the motorized bicycle seatpost assembly in a middle seat position in accordance with the second embodiment.
Figure 14:
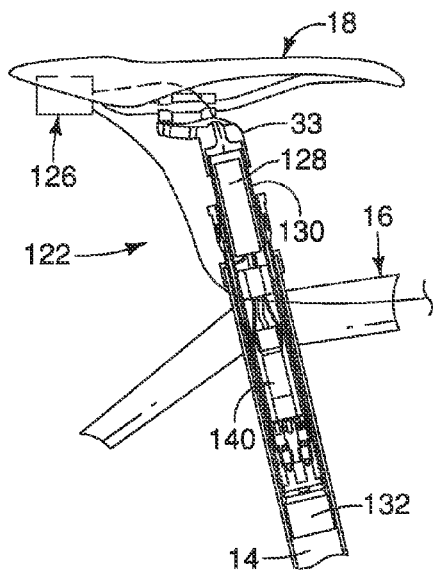
FIG. 14 is a partial side view of the bicycle illustrated in FIGS. 12 and 13 with the motorized bicycle seatpost assembly in a low or top seat position in accordance with the second embodiment.

The upper end 50 of the inner tube 30 also includes an axially extending shaft 58, with the floating piston 34 slidably mounted on the shaft 58 to move in an axial direction of the inner tube 30. Thus, the floating piston 34 is disposed in the interior bore of the inner tube 30 and forms a as chamber 60 disposed between the floating piston 34 and the upper end 50 of the inner tube 30. The axial position of the floating piston 34 changes as the seat position of the telescoping seatpost 22 changes. Specifically, the axial position of the floating piston 34 moves to its lowermost position when the telescoping seatpost 22 is in the high seat position as seen in FIG. 9. The axial position of the floating piston 34 moves to a middle position when the telescoping seatpost 22 is in the middle seat position as seen in FIG. 10. The axial position of the floating piston 34 moves to its uppermost position when the telescoping seatpost 22 is in the low seat position as seen in FIG. 11. Thus, the air or gas in the gas chamber 60 becomes more compressed as seat position of the telescoping seatpost 22 becomes lower with respect to the preceding seat position. The compressed air or gas in the gas chamber 60 provides a driving force for extending the inner tube 30 with respect to the outer tube 32 when the seat position of the telescoping seatpost 22 is changed from a lower position to a higher position. Since the telescoping seatpost 22 includes this structure of the gas chamber 60, the telescoping seatpost 22 functions as a shock absorber when a big downward force applied to the bicycle seat 18.

The valve unit 42 is immovably disposed with respect to the outer tube 32, and divides the interior bore of the inner tube 30 into the first fluid chamber 46 and the second fluid chamber 48 as mentioned above. The first fluid chamber 46 is disposed between the valve unit 42 and the floating piston 34. The second fluid chamber 48 is disposed between the valve unit 42 and the lower end 54 of the inner tube 30. The flow control rod 40 cooperates with the guide member 38 and the valve unit 42 to control the flow of fluid between the first and second fluid chambers 46 and 48 to change the height of the telescoping seatpost 22 as explained below.

The shaft 58 is a hollow tubular member that adjustably supports the rod 36 within its interior passageway. In particular, the upper end of the shaft 58 has an annular flange 62 that is sandwiched between the upper end 50 of the inner tube 30 and the seat mounting member 52. The lower end of the shaft 58 has a stopper member 64 threaded into the lower end of the shaft 58. The stopper member 64 is flanged at its lower end to act as a stop for the floating piston 34 to limit downward movement of the floating piston 34 within the inner tube 30. The upper end of the stopper member 64 act as a stop for the rod 36 to limit downward movement of the floating piston 34 within the hollow interior of the shaft 58.

In the illustrated embodiment, the rod 36 has an adjustment nut 66 threaded onto its upper end. The adjustment nut 66 threadedly engages the internal thread of the shaft 58 to hold the rod 36 in the desired location in an axially adjustable manner. By changing the axial position of the adjustment nut 66, the position of the rod 36 is changed so that the middle seat position is changed. In other words, the rider can set the middle seat position to correspond to one of a plurality of different heights, as needed and/or desired, by turning the adjustment nut 66. In the illustrated embodiment, the lower end of the rod 36 is movably (slidably) disposed with respect to the valve unit 42. The rod 36 has an upper longitudinally extending flute 70 and a lower longitudinally extending flute 72 with a blocking portion 74 dividing the flutes 70 and 72. The blocking portion 74 selectively blocks fluid flowing longitudinally through the center of the valve unit 42 as discussed below.

The outer tube 32 has a first end 80 with an outer attachment ring 82 fixed (threaded) thereto. The first end 80 of the outer tube 32 is open such that the lower end 54 of the inner tube 30 is telescopically disposed in the first end 80 of the outer tube 32. The outer tube 32 has a second end 84 with a bottom support part 86 fixed (threaded) thereto. In particular, an external thread of the bottom support part 86 threadedly engages the internal thread of the first end 80 the outer tube 32 to hold the rod 36 in the desired location in an axially adjustable manner. By changing the axial position of the bottom support part 86, the position of the valve unit 42 is changed so that the low and high seat positions are changed. In other words, the rider can set the low and high seat positions to correspond to one of a plurality of different heights, as needed and/or desired, by turning bottom support part 86.

The outer attachment ring 82 retains an outer cable guide 88 on the external surface of outer tube 32. The outer cable guide 88 guides the movement transmission element 26 through an opening in the side of the outer tube 32. The bottom support part 86 movably supports an actuating device 90 that moves the flow control rod 40 in response to movement of the lever 24a of the operating device 24. The upper surface of the bottom support part 86 acts as a stopper for limiting downward movement of the inner tube 30 with respect to the outer tube 32. In particular, the guide block 56 contacts the upper surface of the bottom support part 86 for limiting downward movement of the inner tube 30 with respect to the outer tube 32. Preferably, the upper surface of the bottom support part 86 includes at least one rubber cushioning element 89.

Basically, the actuating device 90 is movably mounted to the second end 84 of the outer tube 32. The actuating device 90 is operatively coupled to the flow control rod 40 to selectively move the flow control rod 40 in the axial direction of the outer tube 32. The operating device 24 is operatively coupled to the actuating device 90 by the movement transmission element 26 to selectively move the actuating device 90 and thus move the flow control rod 40 to selectively change the height of the telescoping seatpost 22 as explained below.

The actuating device 90 includes a lever 92, a pull rod 94 and a coil compression spring 96. The bottom support part 86 includes a mount portion that pivotally supports the lever 92. The lever 92 has one end of the movement transmission element 26 secured to one end of the lever 92 and the pull rod 94 pivotally secured to the other end of the lever 92 with respect to the pivot axis of lever 92. Thus, pulling and releasing the movement transmission element 26 by moving the lever 24a of the operating device 24 causes the lever 92 of the actuating device 90 to rock about its pivot axis which in turn moves the pull rod 94 within the guide member 38. The coil compression spring 96 is mounted around the pull rod 94, and applies a biasing force on the pull rod 94 in an upward direction.

Figure 8:
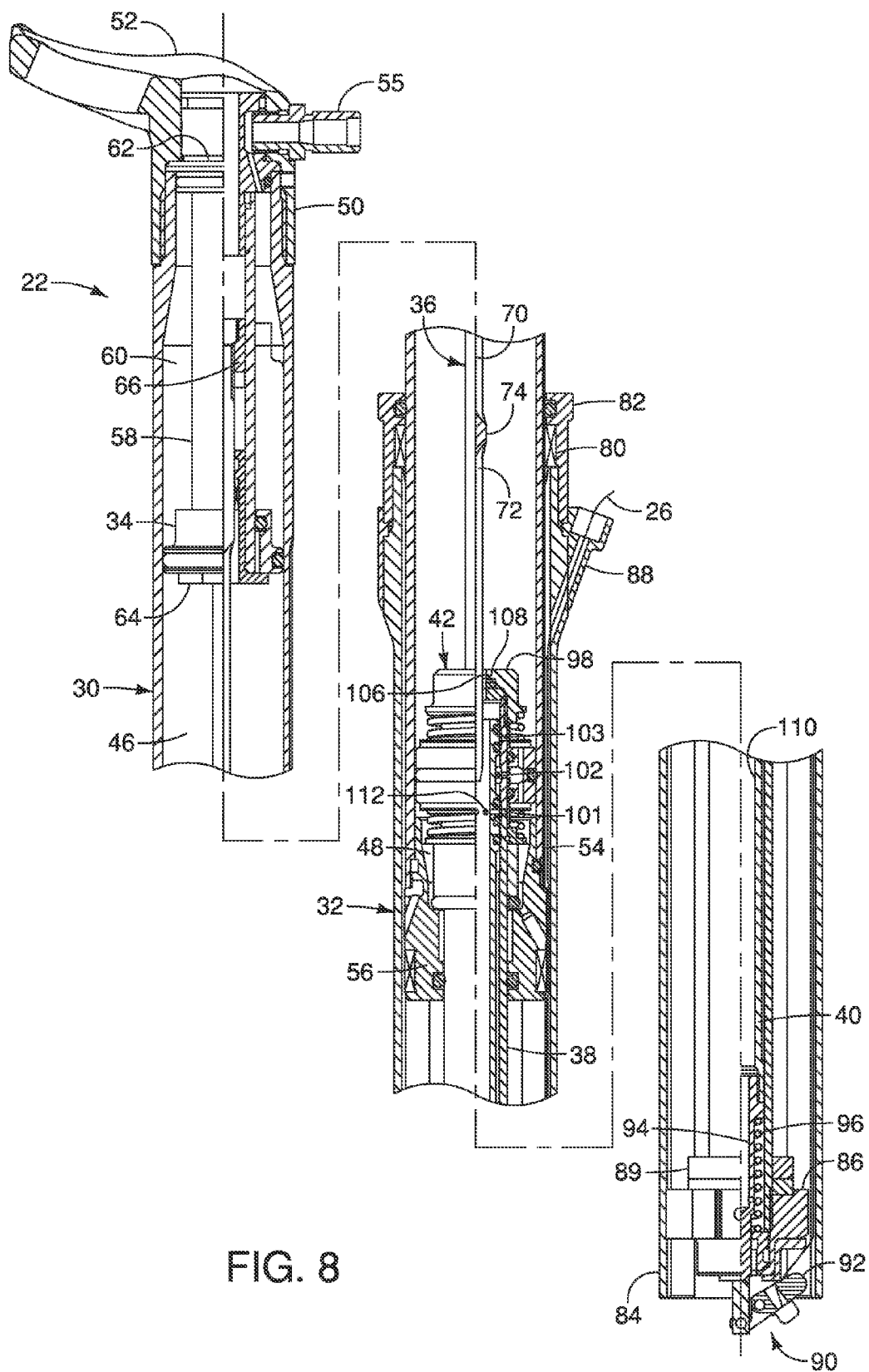
FIG. 8 is a longitudinal cross sectional view of the bicycle seatpost assembly illustrated in FIGS. 1 to 3, with half of selected internal parts shown in elevation and the bicycle seatpost assembly in the high or top seat position.

The lower end of the guide member 38 is fixed (threaded) in a center threaded bore of the bottom support part 86 such that the guide member 38 is coaxially mounted within the outer tube 32. Thus, the guide member 38 is rigidly fixed to the outer tube 32 via the bottom support part 86. A piston nut 98 of the valve unit 42 is threaded on the upper end of the guide member 38 to secure the valve unit 42 to the outer tube 32 via the guide member 38 and the bottom support part 86. The upper end of the guide member 38 is also provided with three sets of radially extending openings 101, 102 and 103. As seen in FIGS. 8 and 9, the first radially extending openings 101 are disposed at a first axial position of the guide member 38 from the bottom support part 86. The second radially extending orifices or openings 102 are disposed at a second axial position of the guide member 38 from the bottom support part 86. The third radially extending orifices or openings 103 are disposed at a third axial position of the guide member 38 from the bottom support part 86. The second radially extending openings 102 are disposed axially between the first and third openings 101 and 103, respectively.

The piston nut 98 has a center opening or passage 106 that slidably receives the rod 36. This passage 106 constitutes a fluid passage of the valve unit 42. A resilient rubber sealing ring 108 is disposed between the piston nut 98 and the upper end of the guide member 38 for selectively engaging the blocking portion 74 of the rod 36 to selectively block and open the passage 106 of the valve unit 42. In other words, the rod 36 is slidably disposed with respect to the valve unit 42 to selectively block and open the passage 106 of the valve unit 42 such that fluid flow between the first and second fluid chambers 46 and 48 is blocked to attain the middle seat position (FIG. 10) between the high and low seat positions.

The flow control rod 40 is a tubular member with a hollow inner channel 110. The flow control rod 40 has its lower end threaded on the upper end of the pull rod 94 within the guide member 38 so that the flow control rod 40 and the pull rod 94 move together as a unit inside the guide member 38 in an axial direction of the outer tube 32. Thus, the flow control rod 40 moves in the axial direction of the outer tube 32 in response to operation of the lever 24a of the operating device 24. The upper end of the flow control rod 40 is provided with a set of radially extending orifices or openings 112 disposed at an axial position that is spaced from the upper end of the flow control rod 40 in the downward direction. The orifices or openings 112 fluidly communicate the inner channel 110. In particular, the openings 112 of the flow control rod 40 fluidly communicates the inner channel 110 with the second fluid chamber 48 when the flow control rod 40 is in the third control position by the rod 36 blocking the passage 106 of the valve unit 42 to block fluid flow between the first and second fluid chambers 46 and 48.

Generally speaking, the flow control rod 40 is moved between three different axial positions to change the height of the telescoping seatpost 22. In this embodiment, the flow control rod 40 has a first control position corresponding to the high seat position (FIG. 9), a second control position corresponding to the low seat position (FIG. 11), and a third control position corresponding to the middle seat position (FIG. 10). More specifically, when the flow control rod 40 is moved axially downward from third control position to the first control position, the high seat position is automatically attained due to the compressed air or gas in the gas chamber 60. When the flow control rod 40 is moved axially upward from the first control position to the third control position, the middle seat position is attained by pushing down on the inner tube 30 to force the fluid to flow from the first chamber 46 to the second chamber 48. When the flow control rod 40 is moved further axially upward from the third control position to the second control position, the low seat position is attained by pushing down on the inner tube 30 to force more of the fluid to flow from the first chamber 46 to the second chamber 48. As mentioned above, the compressed air or gas in the gas chamber 60 provides a driving force for automatically extending the inner tube 30 with respect to the outer tube 32 when the seat position of the telescoping seatpost 22 is changed from a lower position to a higher position.

Referring now to FIGS. 12 to 21, a motorized bicycle seatpost assembly is illustrated with a telescoping seatpost 122 and an operating member or device 124 in accordance with a second embodiment. The telescoping seatpost 122 is mounted to the seat tube 14 in the same manner as the first embodiment. The telescoping seatpost 122 adjusts a seat height of the bicycle seat 18 with respect to the bicycle frame 16 in response to operation of the operating device 124. In this embodiment, the length of the telescoping seatpost 122 is adjustable to a plurality of predetermined or preset seat positions, e.g., a high seat position, a middle seat position and a low seat position. Preferably, the seat positions can be set using a controller 126 that is mounted to the seat 18. The controller 126 allows the rider to set a predetermined amount of upward and downward movements for each of the seat positions that correspond to a plurality of different heights. Thus, the predetermined seat positions can be set. Alternatively, the controller 126 is configured so that the seat positions are attained based on the time that operating device 124 is operated. In this illustrated embodiment, the operating device 124 is mounted to the handlebar 20, and has an operating button 124a for raising the seat 18 and an operating button 124b for lowering the seat 18. The operating buttons 124a and 124b are biased to their rest positions seen in the first illustration from the left in FIGS. 16 to 21.

The telescoping seatpost 122 is a separate unit from the bicycle frame 16 such that it can be easily installed into the seat tube 14 in place of a conventional non-adjustable seatpost. Basically, the telescoping seatpost 122 mainly includes an inner (first) tube 130 and an outer (second) tube 132. The inner and outer tubes 130 and 132 are telescopically arranged, with the amount of insertion of the inner tube 130 into the outer tithe 132 being adjustable. The telescoping seatpost 122 further includes a height adjustment device basically includes a reversible electric motor 140 and a linear movement mechanism 142. The linear movement mechanism 142 threadedly engages an internal thread 144 of the outer tube 132. One example of the height adjustment device of the telescoping seatpost 122 is described in more detail in U.S. application Ser. No. 12/549,436, filed on Aug. 28, 2009 (assigned to Shimano Inc.).

Figure 15:
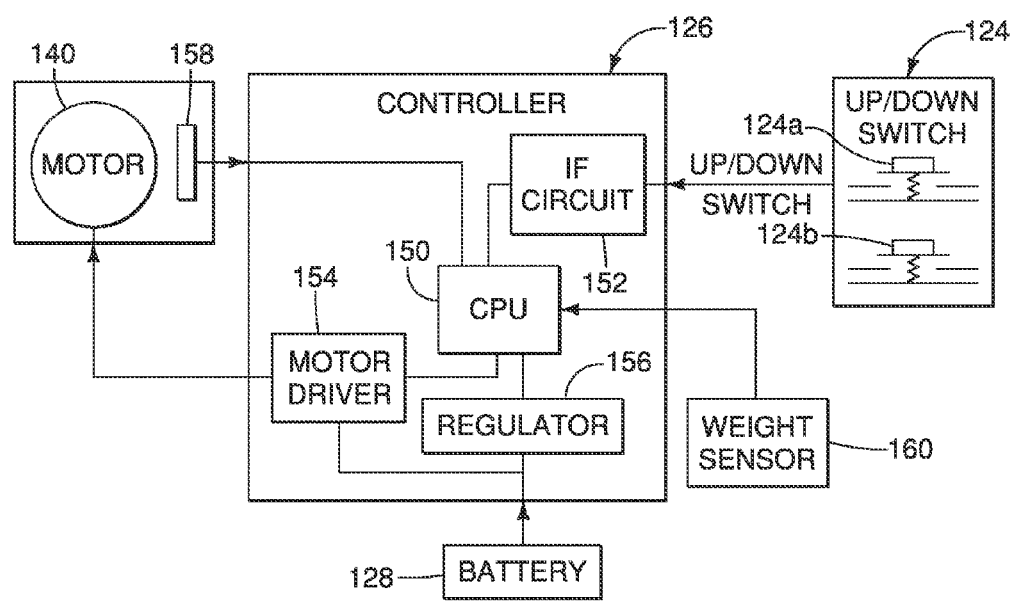
FIG. 15 is a schematic electrical diagram for the motorized bicycle seatpost assembly illustrated in FIGS. 12 to 14.

As seen in FIG. 15, the controller 126 is operatively connected to the motor 140 with the controller 126 having a plurality of different predetermined seat position settings that selectively operate the motor 140 to move the inner tube 130 relative to the outer tube 132. In this illustrated embodiment, the controller 126 includes among other things, a central processing unit or CPU 150, an intermediate frequency (IF) circuit 152, a motor driver 154 and a regulator 156. The controller 126 is powered by the battery 128 that is mounted completely within the inner tube 130.

The central processing unit 150 preferably includes a microcomputer. The central processing unit 150 can also include other conventional components such as an input interface circuit, an output interface circuit, and storage devices such as a ROM (Read Only Memory) device and a RAM (Random Access Memory) device. The intermediate frequency (IF) circuit 152, the motor driver 154 and the regulator 156 are conventional components that are well known in the field. Thus, the components 152, 154 and 156 will not be discussed in detail herein.

A position detecting device 158 is operatively connected to the controller 126. The position detecting device 158 detects a relative position between the inner and outer tubes 130 and 132. Preferably, the position detecting device 158 detects the relative position between the first inner and outer tubes 130 and 132 by detecting a rotation amount of the motor 140 when the controller 126 operates the motor 140. In particular, in the illustrated embodiment, the position detecting device 158 includes an encoder that is mounted on the motor 140 completely within the inner tube 130. The encoder of the position detecting device 158 determine the rotational amount of the motor 140 for determining predetermined seat positions, such as high, middle and low seat positions that correspond to high, middle and low predetermined seat positions. The high seat position (shown in FIG. 12) is a riding position for when the bicycle 10 runs in the flat road or uphill. The middle seat position (shown in FIG. 13) is a riding position for when the bicycle 10 runs in the slightly rapid downhill. The low seat position (shown in FIG. 14) is a riding position for when the bicycle 10 runs in the considerably rapid downhill. While only three predetermined seat positions are illustrated, the number of seat positions is not limited to three predetermined seat positions.

The operating device 124 is operatively connected to the controller 126, and thus, operatively connected to the motor 140. The operating device 124 generates up and down control signals to operate the motor 140 in response to operation of the operating device 124 via the controller 126. The electrical power from the battery 128 is supplied to the operating device 124 via the controller 126 for generating the up and down control signals. The controller 126 outputs seat raising and lowering commands (e.g., electrical signals) to the motor 140 via the motor driver 154 for raising and towering the telescoping seatpost 122 to change the height of the bicycle seat 18. The direction, amount and timing of adjustment of the telescoping seatpost 122 depend on the operation of the operating device 124 as explained below.

In this embodiment, a weight detection device or weight sensor 160 is operatively connected to the controller 126. The weight sensor 160 detects the presents and/or the absence of a downward force (such as the rider's weight) on the seat 18. By controlling the motor 140 with the controller 126 based on signals from the operating device 124 and the weight sensor 160, the bicycle seat 18 can be raised and lowered in the same manner as in FIGS. 5 to 7, if needed an/or desired, as well as in other ways as discussed below.

Figure 16:
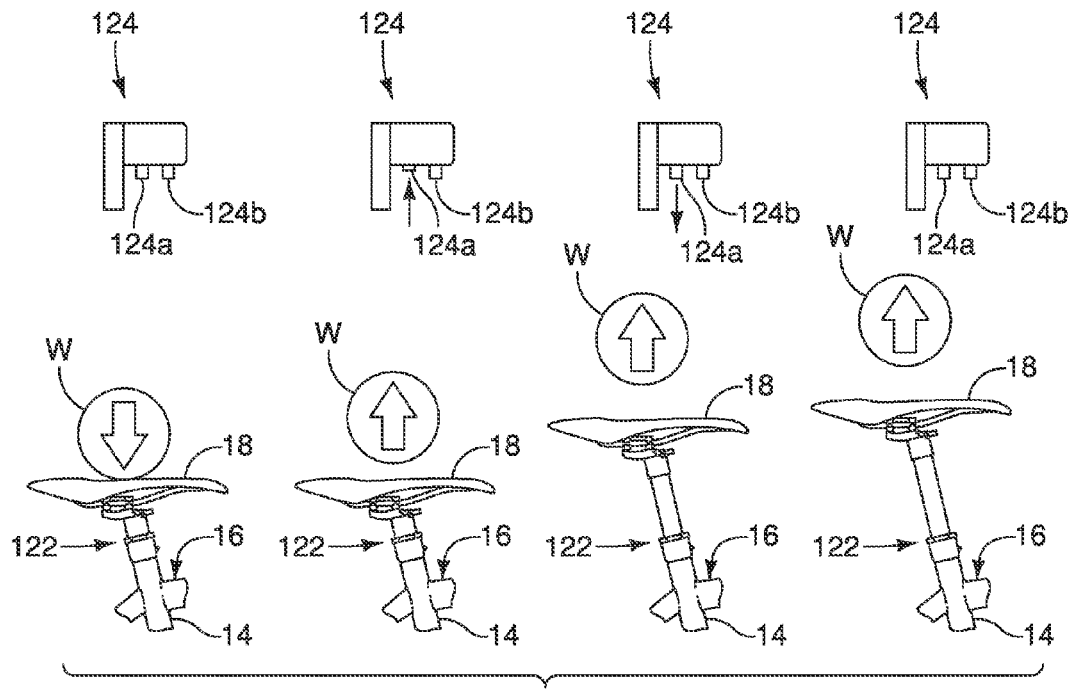
FIG. 16 is a series of diagrammatic views showing a bicycle seat raising operation using the motorized bicycle seatpost assembly illustrated in FIGS. 12 to 14 in which the bicycle seat immediately rises after operating the user operating device.
Figure 17:
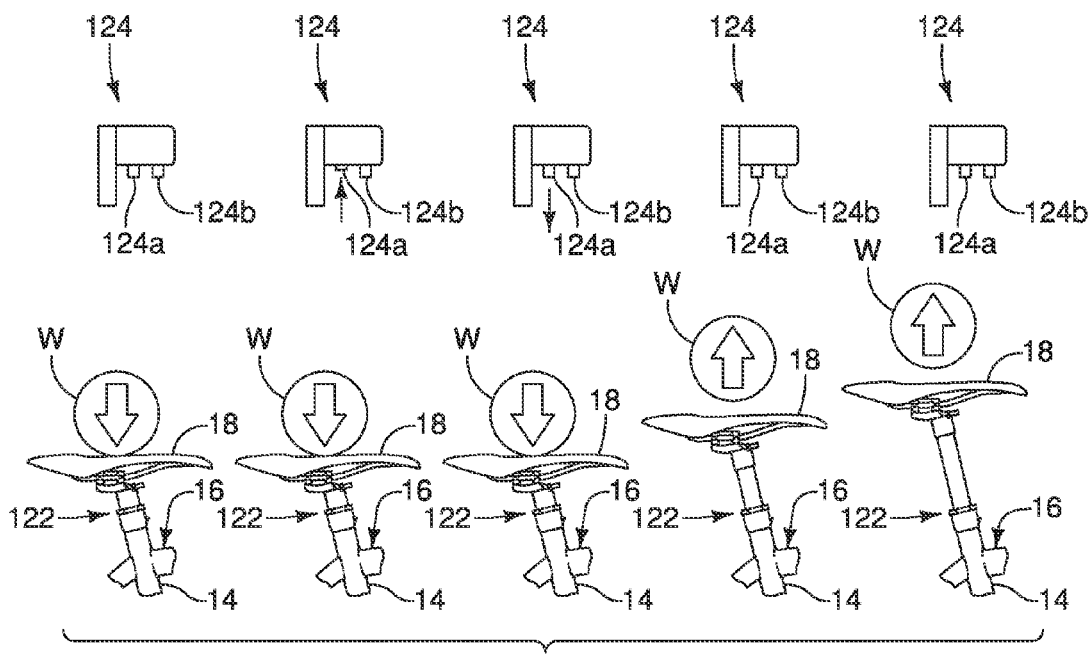
FIG. 17 is a series of diagrammatic views showing a bicycle seat lowering operation using the motorized bicycle seatpost assembly illustrated in FIGS. 12 to 14 in which a downward force (e.g., the weight of the rider) is maintained on the bicycle seat for a period of time after releasing the user operating device with the bicycle seat immediately rising after removal of the downward force on the bicycle seat.
Figure 19:
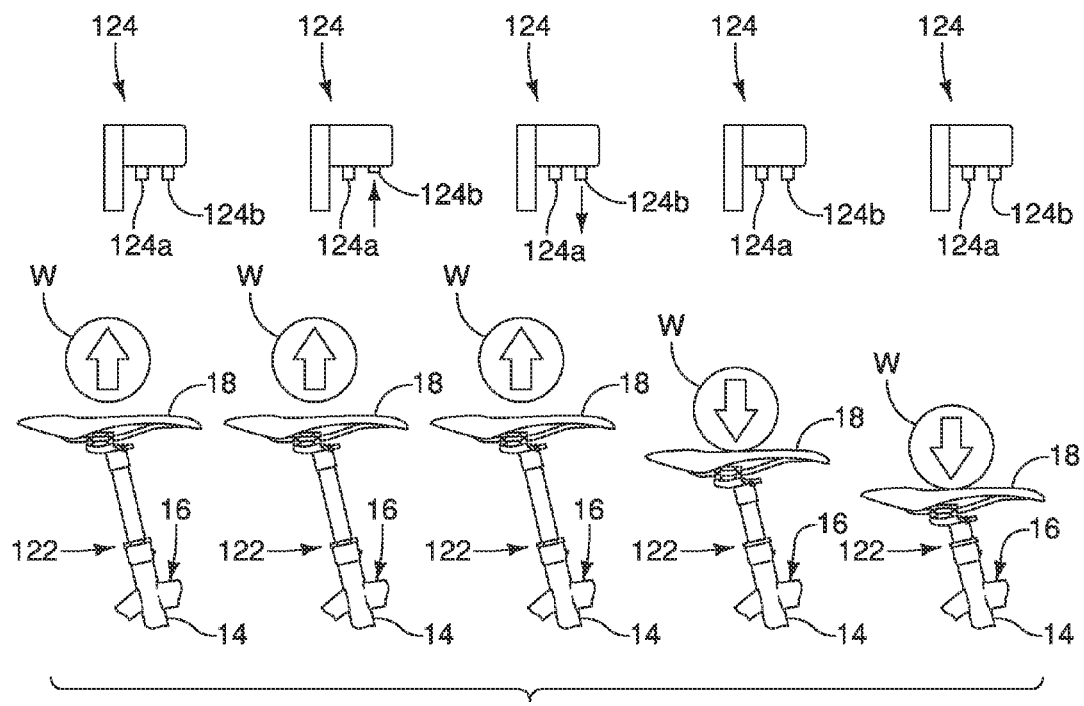
FIG. 19 is a series of diagrammatic views showing a bicycle seat lowering operation using the motorized bicycle seatpost assembly illustrated in FIGS. 12 to 14 in which a downward force (e.g., the weight of the rider) is applied on the bicycle seat some period of time completing after the operation of the user operating device such that the bicycle seat does not immediately fall after releasing the user operating device but rather the bicycle seat falls whenever a downward force (e.g., the weight of the rider) is subsequently applied to the bicycle seat.
Figure 20:
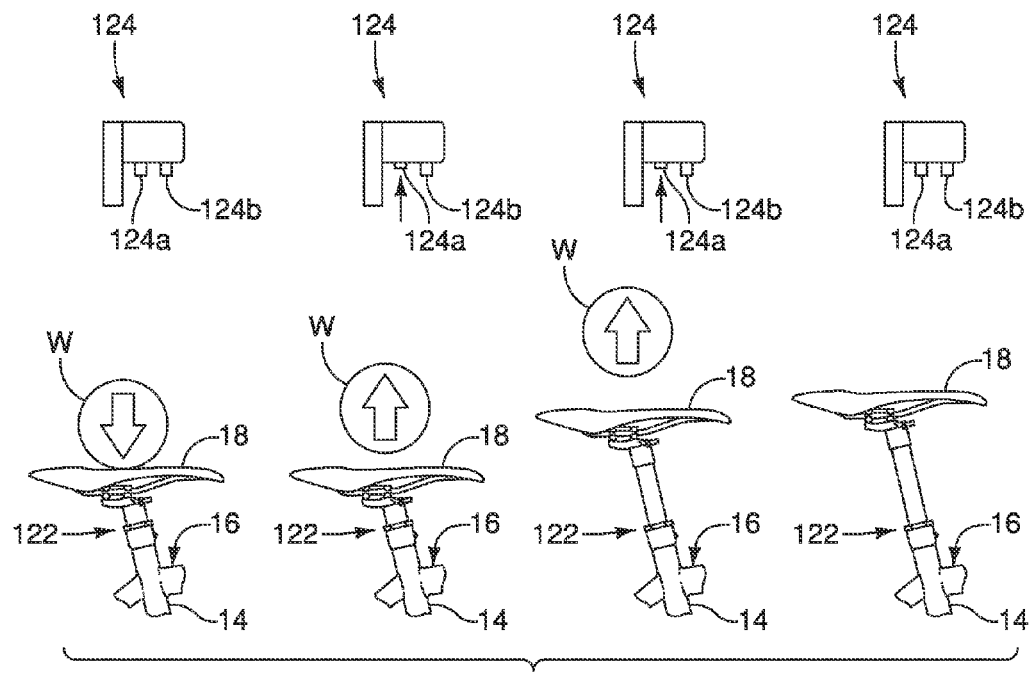
FIG. 20 is a series of diagrammatic views showing a bicycle seat raising operation using the motorized bicycle seatpost assembly illustrated in FIGS. 12 to 14 in which the bicycle seat rises while holding the operating device in an actuating position.

With the configuration of the seatpost assembly 122, if a downward force (e.g., the rider's weight W) is determined to be applied to the bicycle seat 18 by the position detecting device 158 during the seat raising operations (i.e., operation of the motor 140) of FIGS. 16, 17 and 20, then the controller 126 can be configured to control the motor 140 such that the bicycle seat 18 will either stop in its current seat position or will continue until the predetermined seat position is reached. Also with the configuration of the seatpost assembly 122, if the downward force (e.g., the rider's weight W) is determined to be removed from the bicycle seat 18 by the position detecting device 158 during the seat lowering operations (i.e., operation of the motor 140) of FIGS. 18, 19 and 21, then the controller 126 can be configured to control the motor 140 such that the bicycle seat 18 will either stop in its current seat position or will continue until the predetermined seat position is reached.

Operation of the operating button 124a results in a seat raising command being output to raise the bicycle seat 18. Operation of the operating button 124b results in a seat lowering command being output to lower the bicycle seat 18. While the user operating device 124 uses push buttons for the operating buttons 124a and 124b, it will be apparent to those skilled in the bicycle field that other types of operating members can be used instead of push buttons.

In particular, as seen in FIG. 16, when a downward force (such as the rider's weight W) is determined to be absent while the operating button 124a is pushed to the actuating position to raise the bicycle seat 118, the controller 126 determines based on the detection state of the weight sensor 160 to operate the motor 140 to immediately raise the bicycle seat 18 to the next higher predetermined seat position. As seen in FIG. 16, the operating button 124a moves from the actuating position to the rest position upon the rider release the operating button 124a with the motor 140 continuing to operate even after releasing the operating button 124a. However, as seen in FIG. 17, when a downward force (such as the rider's weight W) is determined to be present while the operating button 124a is pushed to the actuating position to raise the bicycle seat 18, the controller 126 determines based on the detection state of the weight sensor 160 to prevent operation of the motor 140 to raise the seat 18 until the downward force (such as the rider's weight W) has been removed. As seen in FIG. 17, the operating button 124a moves from the actuating position to the rest position upon the rider release the operating button 124a with the motor 140 being activated after releasing the operating button 124a and upon determining the downward force (such as the rider's weight W) has been removed.

Figure 18:
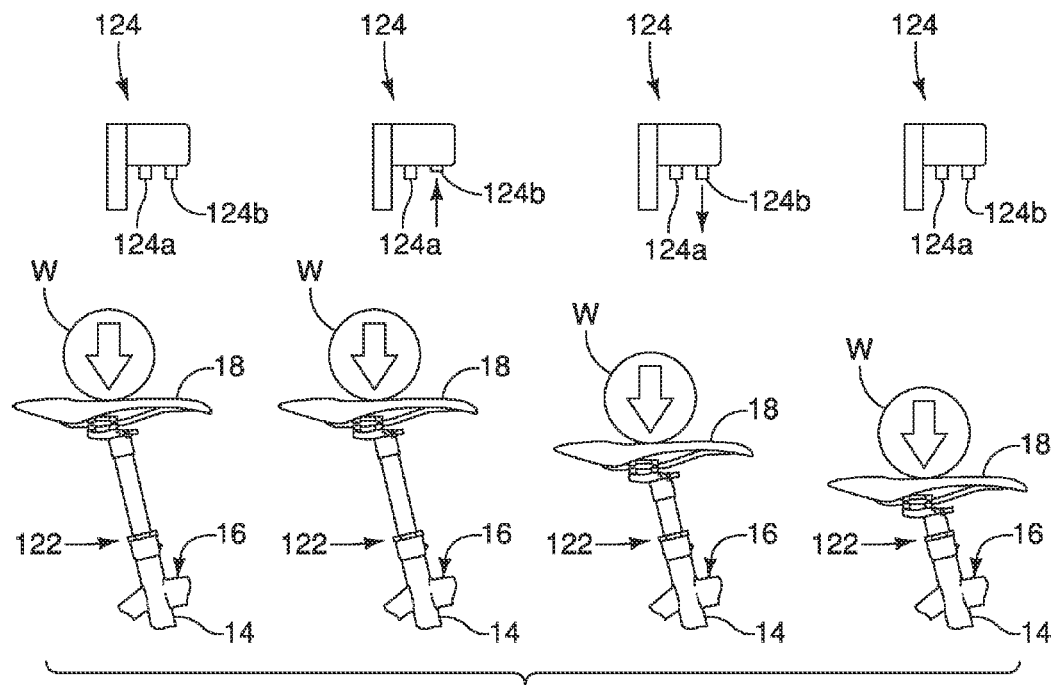
FIG. 18 is a series of diagrammatic views showing a bicycle seat raising operation using the motorized bicycle seatpost assembly illustrated in FIGS. 12 to 14 in which the bicycle seat immediately falls after operating the user operating device in response determining a downward force (e.g., the weight of the rider) being maintained on the bicycle seat during and immediately after the operation of the user operating device.

On the other hand, as seen in FIG. 18, when a downward force (such as the rider's weight W) is determined to be present while the operating button 124b is pushed to the actuating position to lower the bicycle seat 18, the controller 126 determines based on the detection state of the weight sensor 160 to operate the motor 140 to immediately lower the bicycle seat 18 to the next lower predetermined seat position. As seen in FIG. 18, the operating button 124b moves from the actuating position to the rest position upon the rider release the operating button 124b with the motor 140 continuing to operate even after releasing the operating button 124b. However, as seen in FIG. 19, when a downward force (such as the rider's weight W) is determined to be absent while the operating button 124b of the user operating device 124 is pushed to the actuating position to lower the bicycle seat 18, the controller 126 determines based on the detection state of the weight sensor 160 to prevent operation of the motor 140 to lower the seat 18 until at least a prescribed downward force (such as the rider's weight W) or greater has been applied to the bicycle seat 18. As seen in FIG. 19, the operating button 124b moves from the actuating position to the rest position upon the rider release the operating button 124b with the motor 140 being activated after releasing the operating button 124b and upon determining the prescribed downward force (such as the rider's weight W) or greater has been applied to the bicycle seat 18. In this way, the bicycle seat 18 can be raised and lowered in the same manner as in FIGS. 5 to 7.

Figure 21:
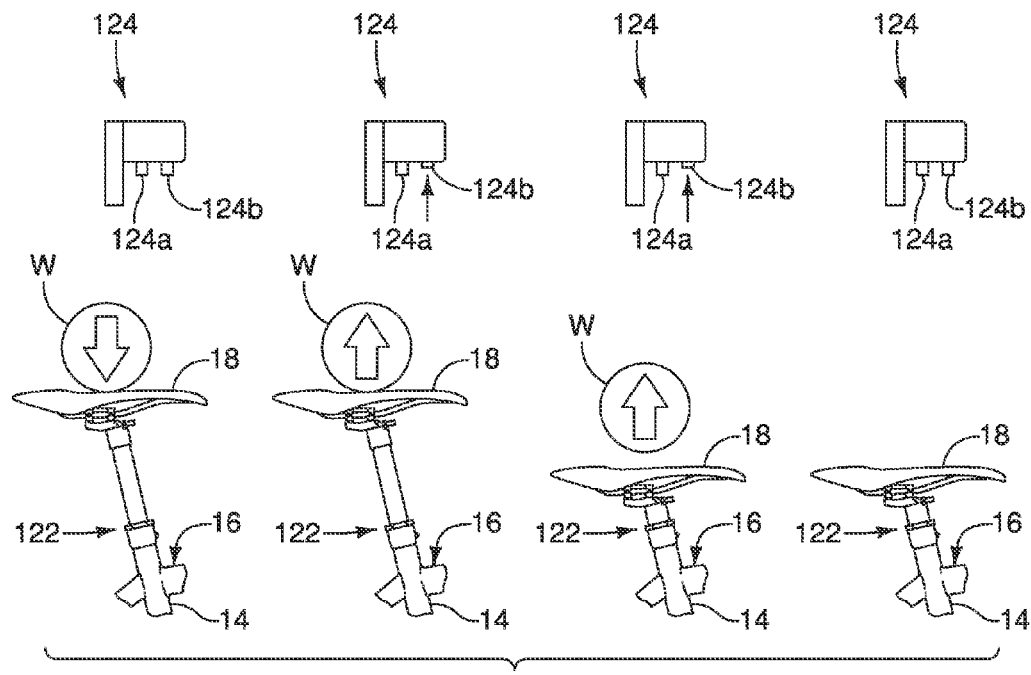
FIG. 21 is a series of diagrammatic views showing a bicycle seat lowering operation using the motorized bicycle seatpost assembly illustrated in FIGS. 12 to 14 in which the bicycle seat lowers while holding the operating device in an actuating position.

In another configuration of the controller 126, as seen in FIGS. 20 and 21, the controller 126 can be configured to control the motor 140 based on signals from the operating device 124 and the weight sensor 160 such that the height of the bicycle seat 18 is only adjusted so long as one of the operating buttons 124a and 124b is in the actuating position. In this configuration, the controller 126 can be configured to control the motor 140 for moving the inner tube 130 to a plurality of predetermined seat positions using the position detecting device 158 and/or to allow the rider to stop the bicycle seat 18 any height by releasing the operating buttons 124a and 124b before the bicycle seat 18 reaches the predetermined seat position.

Referring to FIGS. 20 and 21, bicycle seat height adjustment methods are illustrated for adjusting the height of the bicycle seat 18 using the telescoping seatpost 122 shown herein. In FIG. 20, a first bicycle seat raising operation is illustrated in which the bicycle seat 18 is raised by holding the operating button 124a. In particular, a rider raises the height of the bicycle seat 18 by first operating the operating button 124a of the user operating device 124, which is in the rest position as seen in the first or leftmost illustration in FIG. 20. This operation of the operating button 124a results in a seat raising command being output to raise the bicycle seat 18. In the illustrated embodiment, the operating button 124a of the user operating device 124 is pushed in from the rest position as seen in the first illustration from the left in FIG. 20 to an operating or actuating position as seen in the second illustration from the left in FIG. 20. This movement or operation of the operating button 124a of the user operating device 124 sends an electrical signal to the motor 140 such that the seat raising command operates the motor 140 to turn the linear movement mechanism 142 in a seat raising direction. Once the operating button 124a is released the bicycle seat 18 stops, since the electrical signal to the motor 140 is interrupted. In other words, raising the bicycle seat 18 to a higher seat position that is higher than a previous seat position existing immediately prior to the seat raising command is accomplished by holding the operating button 124a in the second or actuating position. By using the position detecting device 158, the raising of the bicycle seat 18 to the higher seat position results in a predetermined amount of upward movement. In other words, so long as the rider is holding the operating button 124a in the actuating position, the motor 140 will operate until the position detecting device 158 determines that the next higher predetermined seat position has been reached. Once the the next higher predetermined seat position has been reached, the controller 126 will automatically stop the motor 140 regardless of whether the operating button 124a has been released. Preferably, the controller 126 includes an adjustment section that is configured such that the rider can change the predetermined seat positions during raising the seat 18 as needed and/or desired.

In FIG. 21, a first bicycle seat lowering operation is illustrated in which the bicycle seat 18 is lowered by holding the operating button 124b of the user operating device 124. In particular, a rider lowers the height of the bicycle seat 18 by first operating the operating button 124b of the user operating device 124, which is in the rest position as seen in the first or leftmost illustration in FIG. 21. This operation of the operating button 124b of the user operating device 124 results in a seat lowering command being output to lower the bicycle seat 18. In the illustrated embodiment, the operating button 124b of the user operating device 124 is pushed in from the rest position as seen in the first illustration from the left in FIG. 21 to an operating or actuating position as seen in the second illustration from the left in FIG. 21. This movement of the operating button 124b of the user operating device 124 sends an electrical signal to the motor 140 such that the seat lowering command operates the motor 140 to turn linear movement mechanism 142 in a seat lowering direction. Once the operating button 124b is released the bicycle seat 18 stops, since the electrical signal to the motor 140 is interrupted. In other words, lowering the bicycle seat 18 to a lower seat position that is lower than a previous seat position existing immediately prior to the seat lowering command is accomplished by holding the operating button 124b in the second or actuating position. By using a position detecting device 158, the lowering of the bicycle seat 18 to the lower seat position results in a predetermined amount of downward movement. In other words, so long as the rider is holding the operating button 124b in the actuating position, the motor 140 will operate until the position detecting device 158 determines that the next lower predetermined seat position has been reached. Once the the next lower predetermined seat position has been reached, the controller 126 will automatically stop the motor 140 regardless of whether the operating button 124b has been released. Preferably, the controller 126 includes an adjustment section that is configured such that the rider can change the predetermined seat positions during lowering the seat 18 as needed and/or desired.

Preferably, the controller 126 is settable so that the bicycle seat height adjustment methods illustrated in FIGS. 16 to 21 can be selectively combined as needed and/or desired. In other words, the seat raising and lowering commands to the motor 140 can be selectively changed to operate in different ways based on the way the rider operates the operating buttons 124a and 124b. More particularly, the seat raising command sent by the controller 126 to the motor 140 can control the motor 140 such that the motor 140 raises the bicycle seat 18 according the process shown in FIGS. 16 and/or 17, and the seat lowering command sent by the controller 126 to the motor 140 can control the motor 140 such that the motor 140 lowers the bicycle seat 18 according the process shown in FIG. 21. Likewise, the seat raising command sent by the controller 126 to the motor 140 can control the motor 140 such that the motor 140 raises the bicycle seat 18 according the process shown in FIG. 20, and the seat lowering command sent by the controller 126 to the motor 140 can control the motor 140 such that the motor 140 lowers the bicycle seat 18 according the process shown in FIGS. 18 and 19.

Moreover, the controller 126 is preferably settable so that the seat raising operations (i.e., operation of the motor 140) of FIGS. 16, 17 and 20 can be selectively combined as needed and/or desired. In other words, the seat raising command outputted to the motor 140 can be selectively changed between different seat raising commands for operating the motor 140 in different ways based on the way the rider operates the operating button 124a. For example, one time the rider can set the controller 126 to raise the bicycle seat 18 to a higher seat position that is higher than a previous seat position existing immediately prior to the seat raising command after releasing the operating button 124a, and then the next time the rider can set the controller 126 to raise the bicycle seat 18 to a higher seat position that is higher than a previous seat position existing immediately prior to the seat raising command by operating (i.e., holding) the operating button 124a to output a different seat raising command with the bicycle seat raising in the absence of a downward force from the bicycle seat 18. This dual approach can be accomplished by the controller 126 determining how long the operating button 124a is depressed. For example, if the operating button 124a is depressed for less than a prescribed time (e.g., one second or less), then the motor 140 will be driven according the method illustrated in FIGS. 16 and 17. However, if the operating button 124a is depressed for more than the prescribed time, then the motor 140 will be driven according to the method illustrated in FIG. 20.

Likewise, the controller 126 is preferably settable so that the seat lowering operations (i.e., operation of the motor 140) of FIGS. 18, 19 and 21 can be selectively combined as needed and/or desired. In other words, the seat lowering command outputted to the motor 140 can be selectively changed between different seat lowering commands for operating the motor 140 in different ways based on the way the rider operates the operating button 124b. For example, one time the rider can set the controller 126 to lower the bicycle seat 18 to a lower seat position that is lower than a previous seat position existing immediately prior to the seat lowering command after releasing the operating button 124b, and then the next time the rider can set the controller 126 to lower the bicycle seat 18 to a lower seat position that is lower than a previous seat position existing immediately prior to the seat lowering command by applying a downward force on the bicycle seat while operating (i.e., holding) the operating button 124b to output a different seat lowering command with the bicycle seat lowering in the absence of a downward force from the bicycle seat 18. This dual approach can be accomplished by the controller 126 determining how long the operating button 124b is depressed. For example, if the operating button 124b is depressed for less than a prescribed time (e.g., one second or less), then the motor 140 will be driven according the method illustrated in FIGS. 18 and 19. However, if the operating button 124b is depressed for more than the prescribed time, then the motor 140 will be driven according to the method illustrated in FIG. 21.

In understanding the scope of the present invention, as used herein to describe the above embodiment(s), the following directional terms "forward", "rearward", "above", "downward", "vertical", "horizontal", "below" and "transverse" as well as any other similar directional terms refer to those directions of a bicycle equipped with the bicycle seatpost assembly. Accordingly, these terms, as utilized to describe the present invention should be interpreted relative to a bicycle equipped with the bicycle seatpost assembly as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents,

What is claimed is:

1. A bicycle seat height adjustment method comprising:
    operating an operating device such that the operating device outputs a seat raising command which is received by a motorized seat height adjustment mechanism to raise a bicycle seat, the motorized seat height adjustment mechanism including an electric motor;
    releasing the operating device after the operating of the operating device; and
    raising the bicycle seat using the electric motor to a higher seat position that is higher than a previous seat position existing immediately prior to the seat raising command, the raising of the bicycle seat occurring only after the releasing of the operating device such that the bicycle seat remains stationary until the operating device is released.

2. The bicycle seat height adjustment method according to claim 1, wherein
    the raising of the bicycle seat to the higher seat position includes removing a downward force from the bicycle seat.

3. The bicycle seat height adjustment method according to claim 1, wherein
    the raising of the bicycle seat to the higher seat position results in a predetermined seat position.

4. The bicycle seat height adjustment method according to claim 3, further comprising
    setting the predetermined seat position to correspond to one of a plurality of different heights.

5. The bicycle seat height adjustment method according to claim 1, further comprising
    operating the operating device such that the operating device outputs a seat lowering command which is received by the motorized seat height adjustment mechanism to lower the bicycle seat;
    releasing the operating device after the operating of the operating device to output the seat lowering command; and
    lowering the bicycle seat using the electric motor to a lower seat position that is lower than a previous seat position existing immediately prior to the seat lowering command after releasing the operating device.

6. The bicycle seat height adjustment method according to claim 5, wherein
    the lowering of the bicycle seat to the lower seat position includes applying a downward force on the bicycle seat.

7. The bicycle seat height adjustment method according to claim 5, wherein
    the raising of the bicycle seat to the higher seat position results in a predetermined first seat position, and
    the lowering of the bicycle seat to the lower seat position results in a predetermined second seat position.

8. The bicycle seat height adjustment method according to claim 7, further comprising
    setting at least one the predetermined first and second seat position to correspond to one of a plurality of different heights.

9. The bicycle seat height adjustment method according to claim 1, wherein
    the operating of the operating device includes outputting the seat raising command in the absence of a downward force on the bicycle seat, and
    the raising of the bicycle seat using the electric motor to a higher seat position is accomplished by operating the operating device to output the seat raising command with the bicycle seat rising in the absence of the downward force on the bicycle seat.

10. A bicycle seat height adjustment method comprising:
    operating an operating device such that the operating device outputs a seat lowering command which is received by a motorized seat height adjustment mechanism to lower the bicycle seat, the motorized seat lowering mechanism including an electric motor;
    releasing the operating device after the operating of the operating device; and
    lowering the bicycle seat using the electric motor to a lower seat position that is lower than a previous seat position existing immediately prior to the seat lowering command, the lowering of the bicycle seat occurring only after the releasing of the operating device such that the bicycle seat remains stationary until the operating device is released.

11. The bicycle seat height adjustment method according to claim 10, wherein
    the lowering of the bicycle seat to the lower seat position includes applying a downward force on the bicycle seat.

12. The bicycle seat height adjustment method according to claim 10, wherein
    the lowering of the bicycle seat to the lower seat position results in a predetermined seat position.

13. The bicycle seat height adjustment method according to claim 12, further comprising
    setting the predetermined seat position to correspond to one of a plurality of different heights.

14. The bicycle seat height adjustment method according to claim 10, wherein
    the operating of the operating device includes outputting the seat lowering command while a downward force is applied to the bicycle seat, and
    the lowering of the bicycle seat using the electric motor to a lower seat position is accomplished by applying the downward force to the bicycle seat while operating the operating device to output the seat lowering command and after operating the operating device.

15. The bicycle seat height adjustment method according to claim 10, further comprising
    operating the operating device such that the operating device outputs a seat raising command which is received by the motorized seat height adjustment mechanism to raise the bicycle seat; and
    raising the bicycle seat using the electric motor to a higher seat position that is higher than a previous seat position existing immediately prior to the seat raising command after releasing the operating device to output the seat raising command.

* * * * *